(12) United States Patent
Takahashi et al.

(10) Patent No.: US 7,478,319 B2
(45) Date of Patent: Jan. 13, 2009

(54) WEB PAGE VIEWING APPARATUS

(75) Inventors: Susumu Takahashi, Nagareyama (JP); Yoshiki Momiyama, Mitaka (JP); Akira Ichiyanagi, Yokohama (JP)

(73) Assignee: Komatsu Ltd., Tokyo (JP)

( * ) Notice: Subject to any disclaimer, the term of this patent is extended or adjusted under 35 U.S.C. 154(b) by 491 days.

(21) Appl. No.: 10/911,688

(22) Filed: Aug. 5, 2004

(65) Prior Publication Data
US 2005/0033824 A1 Feb. 10, 2005

(30) Foreign Application Priority Data
Aug. 8, 2003 (JP) ............................. 2003-289605

(51) Int. Cl.
*G06F 17/00* (2006.01)
(52) U.S. Cl. ...................... 715/229; 715/273
(58) Field of Classification Search ................ 715/513, 715/526, 234, 229, 273; 703/23
See application file for complete search history.

(56) References Cited

U.S. PATENT DOCUMENTS

| | | | |
|---|---|---|---|
| 2002/0065800 A1* | 5/2002 | Morlitz | 707/1 |
| 2002/0112020 A1* | 8/2002 | Fisher | 709/215 |
| 2002/0120607 A1* | 8/2002 | Price et al. | 707/1 |
| 2004/0003351 A1* | 1/2004 | Sommerer et al. | 715/517 |
| 2004/0210433 A1* | 10/2004 | Elazar et al. | 703/24 |
| 2005/0004903 A1* | 1/2005 | Tsuda | 707/3 |
| 2005/0033657 A1* | 2/2005 | Herrington et al. | 705/26 |

FOREIGN PATENT DOCUMENTS

| | | |
|---|---|---|
| JP | 10-042115 | 2/1998 |
| JP | 2000-181674 | 6/2000 |
| JP | 2001-274945 | 10/2001 |
| JP | 2002-24225 | 1/2002 |
| JP | 2002-142191 | 5/2002 |
| JP | 2002-229894 | 8/2002 |
| JP | A-2002-300654 | 10/2002 |

OTHER PUBLICATIONS

Abrams, David, et al, "Information Archiving with Bookmarks: Personal Web Space Construction and Organization", Proceedings of the SIGCHI Conference on Human Factors in Computing Systems CHI '98, Jan. 1998, pp. 41-48.*

Liu, Ling, et al, "Web CQ-Detecting and Delivering Information Changes on the Web", Proceedings of the Ninth International Conference on Information and Knowledge Management CIKM '00, Nov. 2000, pp. 512-519.*

* cited by examiner

*Primary Examiner*—Laurie Ries
(74) *Attorney, Agent, or Firm*—Posz Law Group, PLC

(57) ABSTRACT

The present invention provides a Web page viewing apparatus with which a viewer can view a Web page at the time of offline with the same operability as at the time of online and an operation for reading latest data is easy. The Web page viewing apparatus includes an image information storing unit for storing image information of a Web page viewed online, a page to be displayed selecting unit that selects a page of a Web page image that a viewer desires to view and a first comparing unit that, when image information corresponding to the selected page is stored in the image information storing unit, displays the image information stored in the image information storing unit.

12 Claims, 7 Drawing Sheets

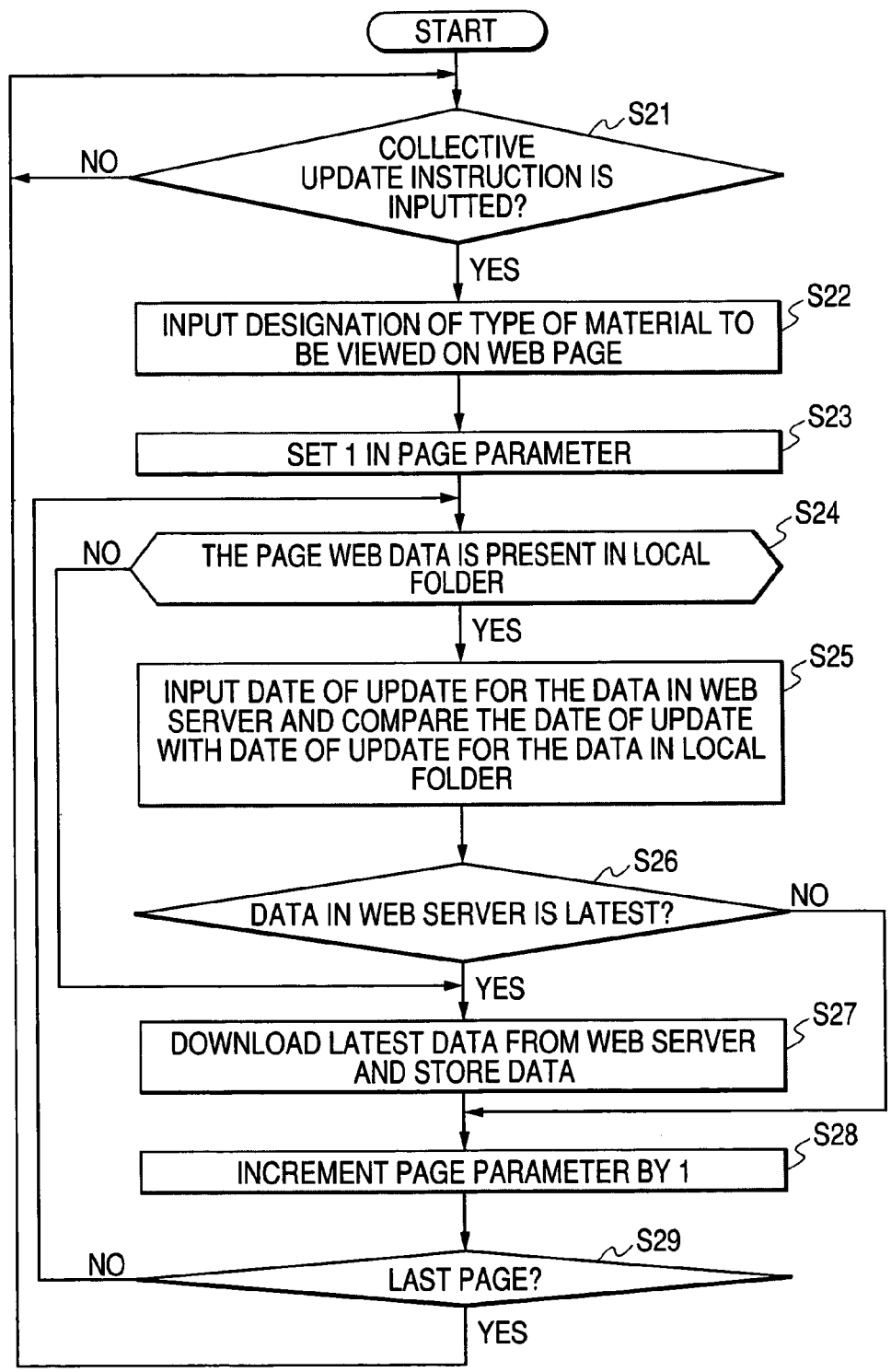

WEB PAGE VIEWING APPARATUS

BACKGROUND OF THE INVENTION

1. Field of the Invention

The present invention relates to a Web page viewing apparatus, and in particular, to a Web page viewing apparatus with which a viewer can view Web pages with high operability without being affected by a communication failure on the Internet.

2. Description of the Related Art

In recent years, inspection of information via the Internet has become popular. For example, a user instruction, a maintenance manual, and the like for a machine sold by a company appear on a Web page of the company such that service persons of service dealers for the machine or maintenance personnel of customers can perform maintenance for the machine reading the user instruction, the maintenance manual, and the like. In addition, a parts list of a sold machine also appears on a Web page such that service dealers or customers can place an order for parts necessary for maintenance and improvement (for example, see JP-A-2002-24225). In provision of information using such a Web page, contents appearing on the Web page are often updated, and a person viewing the Web page is required to always access the Web page to obtain latest information in order to have the latest information displayed on the Web page.

However, a viewing apparatus in accordance with a conventional Web page viewing technique has problems as described below.

The viewing apparatus cannot read image information from a Web page server (hereinafter simply referred to as Web server) temporarily according to circumstances in locations where a communication failure on the Internet occurs such as the inside of a building, an underground floor, a space between buildings, and a mountain valley. In such a case, for example, when a person is repairing a machine while reading materials such as a user instruction, a maintenance manual, and a parts manual on a Web page, since the person cannot view the materials at will, the person cannot have an arbitrary page necessary for the repair displayed on the Web page. As a result, longer time is required for the repair.

On the other hand, usually, a personal computer is often used as a terminal for Web page viewing. In that case, a viewer inputs data with a so-called WWW browser in order to read character information and image information of a Web page from a Web server. In general, when the viewer views the Web page using this WWW browser, screen information (including character information and image information) at the time of the viewing is automatically stored in a predetermined temporary memory in the personal computer for each screen in an order of viewing. Thereafter, when the viewer performs a "return" operation, the image information stored in the temporary memory is read out and displayed on the Web page in an order opposite to the order of viewing.

Therefore, when the viewer views the Web page using the conventional WWW browser as described above, in general, even if data (image information) cannot be read from a Web server according to circumstances, the image information stored in the temporary memory can be displayed. Thus, the viewer can have image information viewed once displayed on the Web page again. However, the image information can only be displayed in the order opposite to the order of viewing, and the temporary memory has a limited capacity and adopts a storage system in which, when a storage capacity is fully used, data stored earlier is deleted every time data is stored (first-in first-out). Consequently, in the case of an image including systematically described contents like materials such as a user instruction, a maintenance manual, and a parts manual, there is a problem in that it is difficult to directly designate a page of the materials, which the viewer desires to view, and have the image displayed on the Web page, and operability is low.

When the viewer designates image information, which the viewer desired to save, and stores the image information in the personal computer in a form of a file but cannot read data from the Web server due to a communication failure on the Internet, the viewer can also have the image information, which is saved in the form of a file, displayed on the web page offline. However, even in this case, the viewer has to judge which of the image information saved in the form of a file and latest image information on the Web page (data on the server) is new and old, that is, the viewer has to compare dates of update of the image information saved in the form of a file and the latest image information on the Web page. Therefore, the image information saved in the form of a file cannot be matched with the image information on the Web page. Consequently, the viewer needs to read the latest information from the Web page every time the viewer views the Web page. Thus, there is also a problem in that operability is low because an operation for reading the latest information is troublesome, and when a data capacity of the image information at that point is large, it takes time to download the image information.

SUMMARY OF THE INVENTION

The present invention has been devised in view of the above-mentioned problems. It is an object of the invention to provide a Web page viewing apparatus with which a viewer can view a web page at the time of off line with the same operability as at the time of online and an operation for reading latest data is easy.

In order to attain the above-mentioned object, the invention provides a Web page viewing apparatus including: an image information storing unit for storing image information of a Web page viewed online; a page to be displayed selecting unit that selects a page of a Web page image that a viewer desires to view; and a first comparing unit that, when image information corresponding to the page selected by the page to be displayed selecting unit is stored in the image information storing unit, displays the image information stored in the image information storing unit.

Consequently, the image information of the Web page viewed online is stored in the image information storing unit and, if the image information corresponding to the page selected by the viewer using the page to be displayed selecting unit is stored in the image information storing unit, the image information is displayed, whereby the viewer can view the Web page. Therefore, since viewing is not interrupted even if a communication failure on the Internet or the like occurs, operability can be improved. Consequently, even if a communication failure occurs while a service person is maintaining a machine viewing a material such as a maintenance manual on the Web page, since the maintenance work can be continued, operability is high. In addition, since the viewer can view the Web page stored in the image information storing unit at any time and in any place without the intervention of the Internet, operability can be improved.

The invention provides the Web page viewing apparatus, in which the image information storing unit stores image information of each page of the Web page and data on a date of update for the image information of the page on the Web page, and at the time of viewing of the Web page online, when the image information corresponding to the page selected by the page to be displayed selecting unit is stored in the image information storing unit, the first comparing unit compares the date of update for the image information stored in the image information storing unit and a date of update for image information corresponding to the page in the Web server, and when the image information corresponding to the page in the Web server is newer, reads latest image information corresponding to the page from the Web server, and updates the image information of the page stored in the image information storing unit to the latest image information.

Consequently, when the image information of the Web page corresponding to the selected page is newer than the image information stored in the image information storing unit, the image information stored in the image information storing unit is updated using the image information read from the Web page. Thus, the viewer is not required to be conscious whether the date of update for the image information stored in the image information storing unit is earlier or later, and operability is can be improved.

The invention provides the Web page viewing apparatus further including a table of contents information storing unit for storing table of contents data on the Web page viewed online together with data on a date of update for the table of contents data on the Web page, in which, at the time of viewing of the Web page online, the first comparing unit compares a date of update for each of the table of contents data stored in the table of contents information storing unit and a date of update for table of contents data in the Web server, and when the table of contents data in the Web server is newer, reads the latest table of contents data from the Web server, and updates the table of contents data stored in the table of contents information storing unit to the latest table of contents data.

Consequently, the table of contents data on the Web page is stored in the table of contents information storing unit together with the data on a date of update for the table of contents data on the Web page, and at the time of viewing of the Web page online, the table of contents data stored in the table of contents information storing unit using the latest table of contents data on the Web page. Thus, even if a communication failure on the Internet or the like occurs, since the viewer can view the Web page on the basis of the latest table of contents data stored in the table of contents information storing unit, operability at the time of viewing can be improved.

The invention provides the Web page viewing apparatus further including a second comparing unit that, at the time of viewing of the Web page online, updates the image information stored in the image information storing unit collectively to the latest image information corresponding to all pages in the Web server.

Consequently, since the image information stored in the image information storing unit can be updated collectively to the latest image information corresponding to the all the pages in the Web server, an update operation is not troublesome but can be performed easily.

The invention provides the Web page viewing apparatus further including a selecting unit that selects types of Web page materials, which are objects to be updated collectively, for each machine or apparatus, in which the second comparing unit updates the materials selected by the selecting unit collectively.

Consequently, since objects to be updated collectively are selected for each type of a Web page material, a material desired to be updated can be updated efficiently, and operability is high.

BRIEF DESCRIPTION OF THE DRAWINGS

In the accompanying drawings:

FIG. 10 is a flowchart representing a collective update processing procedure in the second embodiment of the invention.

DETAILED DESCRIPTION OF THE INVENTION

First, a first embodiment of the present invention will be explained in detail with reference to the accompanying drawings.

Figure 1:
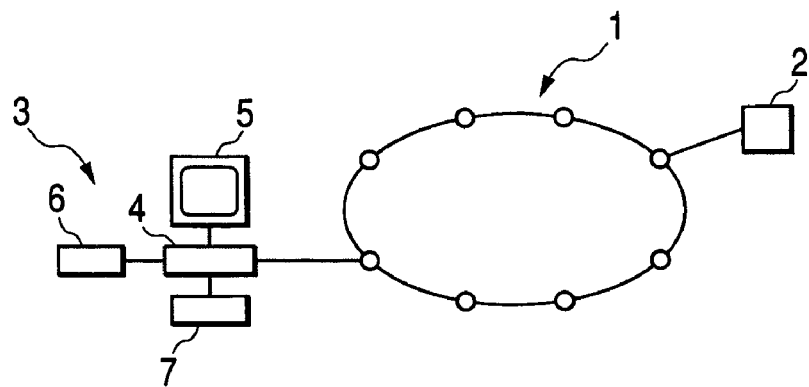
FIG. 1 is a schematic explanatory diagram of a Web page viewing system to which a Web page viewing apparatus of the invention is applied.

FIG. 1 is a schematic explanatory diagram of a Web page viewing system to which the invention is applied. A Web server 2, which manages a Web page of a specific company, and a Web page viewing apparatus 3 serving as a client for viewing the Web page are provided on the Internet 1. The number of Web page viewing apparatuses 3 to be provided corresponds to the number of viewers. However, only one Web page viewing apparatus 3 is shown in the figure. The Web page viewing apparatus 3 consists of a personal computer or the like and includes a computer main body (hereinafter referred to as CPU) 4, a graphic display device 5 consisting of a CRT, a liquid crystal display device, or the like, a storage 6 consisting of a hard disk device, an MO device, or the like, and an operation device 7 consisting of a keyboard, a mouse, or the like.

Figure 2:
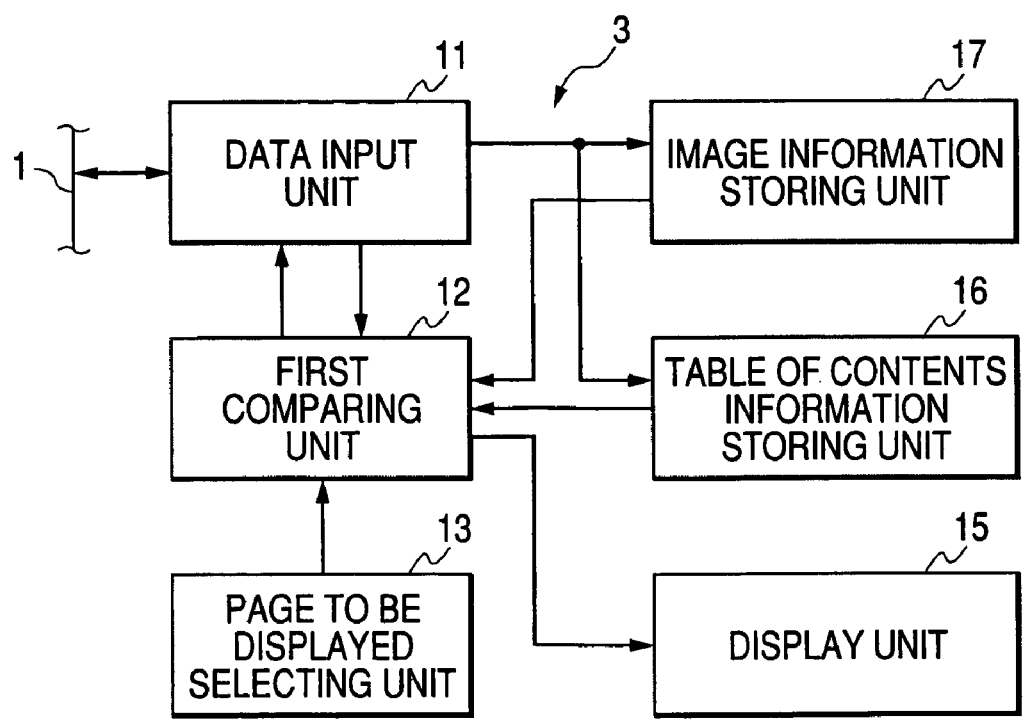
FIG. 2 is a functional block diagram of the Web page viewing apparatus in accordance with a first embodiment of the invention.

FIG. 2 is a functional block diagram of a Web page viewing apparatus of the invention. A Web page viewing apparatus 3 includes a data input unit 11, a first comparing unit 12, a page to be displayed selecting unit 13, a display unit 15, a table of contents information storing unit 16, and an image information storing unit 17. The table of contents information storing unit 16 and the image information storing unit 17 are hereinafter collectively referred to as a local folder.

The data input unit 11 inputs image information data, table of contents information data, and data on dates of update for the image information data and the table of contents information data from the Web server 2 via the Internet 1. This image information includes character information of an image and background image information corresponding to each page of a web page. The image information data is transferred between the Web server 2 and the data input unit 11 in a compressed form.

The first comparing unit 12 compares the data on a date of update for the Web page image information, which is inputted from the Web server 2 via the data input unit 11, and data on a date of update for Web page image information stored in the image information storing unit 17 in the local folder. On the basis of a result of the comparison, the first comparing unit 12 stores a newer one of the Web page image information data inputted from the server 2 and the Web page image information data in the local folder in the image information storing unit 17 and displays the Web page image information data. In addition, the first comparing unit 12 compares the data on a date of update for the Web page table of contents information, which is inputted from the Web server 2, and the data on a date of update for table of contents information stored in the table of contents information storing unit 16 in the local folder. On the basis of a result of the comparison, the first comparing unit 12 stores a newer one of the Web page table of contents information data inputted from the Web server 2 and the table of contents information data in the local folder in the table of contents information storing unit 16 and displays the table of contents information data.

The page to be displayed selecting unit 13 is an input unit for selecting a Web page that a viewer desires to display in the Web page viewing apparatus, that is, Web data that the viewer desires to view. In this embodiment, the page to be displayed selecting unit 13 is subjected to a selection operation using the operation device 7 such as a keyboard and a mouse. The display unit 15 outputs display data to a graphic display device 5 and causes the graphic display device 5 to display the display data in response to a display instruction from the first comparing unit 12. The table of contents information storing unit 16 stores a table of contents of image information data of a Web page that is viewed by a viewer once, that is, a name and a page of each image information data. The image information storing unit 17 stores image information data of a Web page that is viewed by a viewer once.

Figure 3:
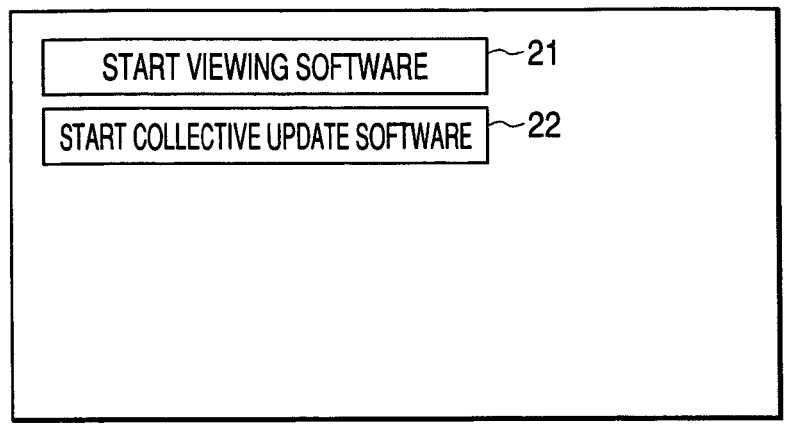
FIG. 3 is a startup screen in accordance with first and second embodiments of the invention.
Figure 4:
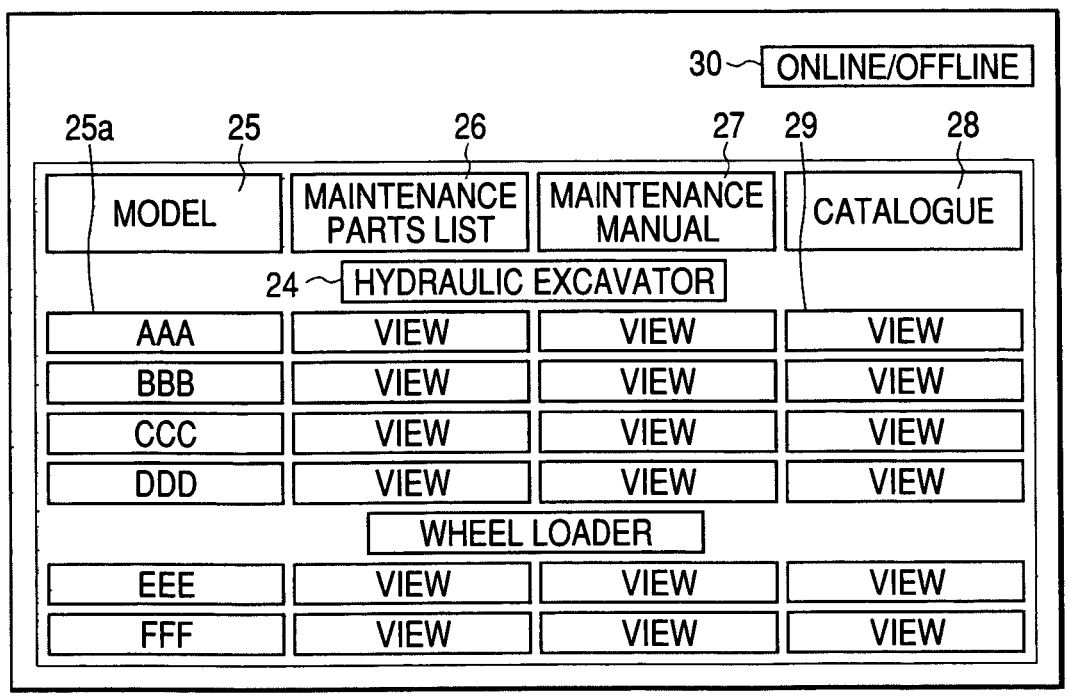
FIG. 4 is a material to be viewed selection screen in accordance with the first and the second embodiments of the invention.
Figure 5:
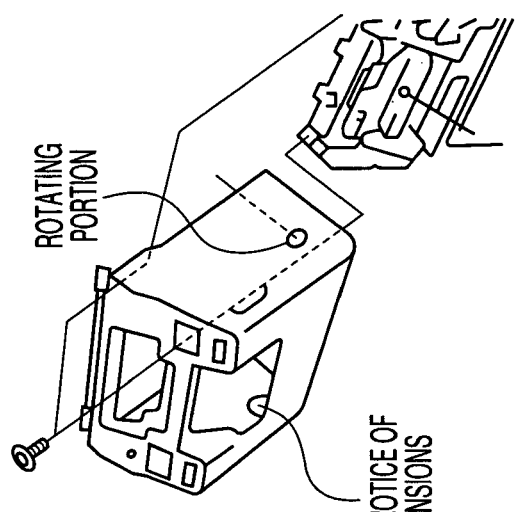
FIG. 5 is a material display screen in accordance with the first and the second embodiments of the invention.
Figure 6:
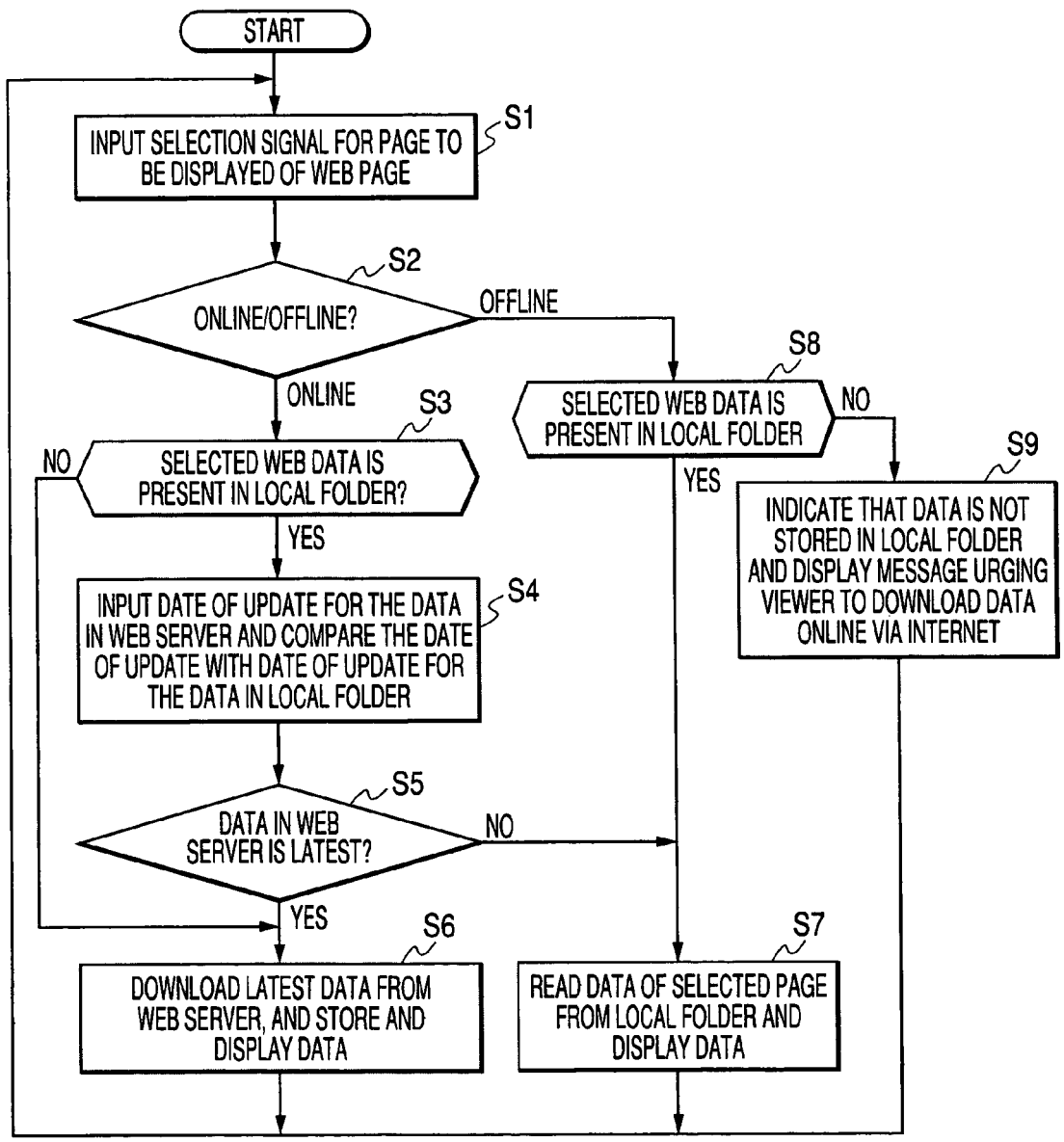
FIG. 6 is a flowchart representing a processing procedure for image display in the first embodiment of the invention.
Figure 7:
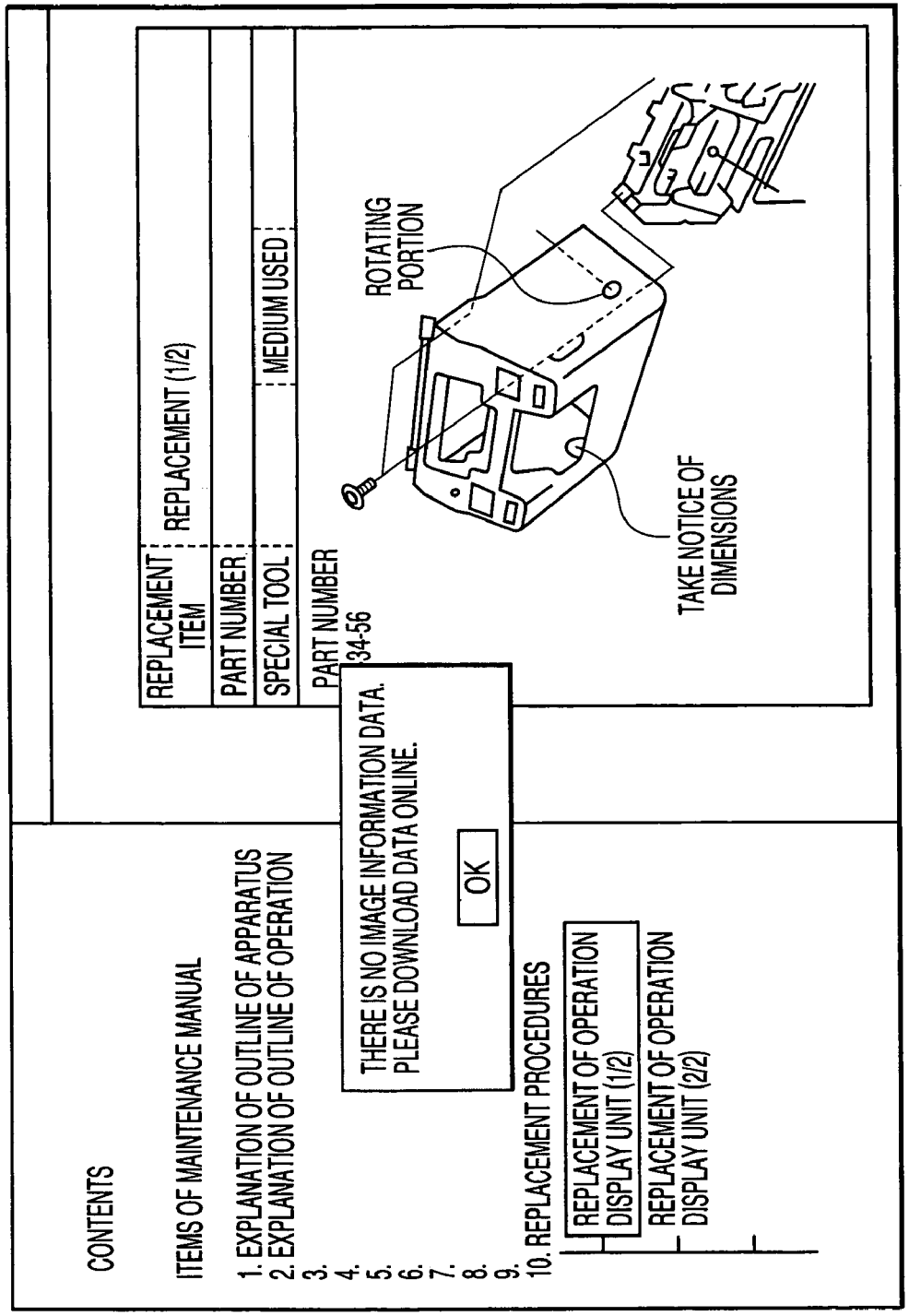
FIG. 7 is a diagram showing an example of error message display in the first and the second embodiments of the invention.

Next, a procedure for Web data display processing of the Web page viewing apparatus in accordance with the invention will be explained on the basis of FIGS. 3 to 7. FIGS. 3 to 5 and FIG. 7 are diagrams showing examples of screens that are displayed on the graphic display device 5 during an operation by a viewer. FIG. 3 shows an example of a startup screen, FIG. 4 shows an example of a material to be viewed selection screen, FIG. 5 shows an example of a material display screen, and FIG. 7 shows an example of error message display. In addition, FIG. 6 is a flowchart representing a processing procedure for Web data display.

Here, before explaining the processing procedure for Web data display, a procedure of operations by a viewer using the Web page viewing apparatus 3 will be explained. Viewing software of the Web page viewing apparatus 3 is started from the startup screen shown in FIG. 3. On this screen, a viewing software starting switch 21 and a collective update software starting switch 22 are displayed. When the viewer moves a cursor to the viewing software starting switch 21 using the keyboard, the mouse, or the like serving as the operation device 7 and performs a startup operation (depresses an Enter key or clicks a mouse button; this applies to the following description as well), a material to be viewed selection screen for a Web page as shown in FIG. 4 is displayed. On this material to be viewed selection screen, for each type 24 of a machine, model codes 25*a* representing models 25 of the machine, view starting switches 29 for each of materials to be viewed 26, 27, and 28 corresponding to the respective model codes 25*a*, and an online/offline selecting switch 30 for selecting online or offline are displayed. FIG. 4 shows an example in which a maintenance parts list 26, a maintenance manual 27, and a catalogue 28 are displayed as materials to be viewed 26, 27, and 28, respectively.

On this screen, the viewer selects an operation mode of online (an Internet connection state) or offline (an Internet non-connection state) using the online/offline selecting switch 30 and further selects the respective view starting switches 29 for the materials to be viewed 26, 27, and 28, which the viewer desires to view, to start viewing. When viewing is started online, the viewer automatically accesses a Web server having a material to be viewed. Note that the indication "view" on the view starting switches 29 in FIG. 4 represents that there are materials that can be viewed. If there is no material that can be viewed, an indication representing to that effect is made on the view starting switches 29.

When the viewer selects any one of the materials to be viewed 26, 27, and 28 and starts viewing using the view starting switches 29, the selected material to be viewed is displayed as shown in FIG. 5. FIG. 5 shows an example of a screen in the case in which the maintenance manual 27 is selected. A table of contents is displayed on the left of this screen, and a manual showing a maintenance procedure and the like in a form of a figure or a comment is displayed on the right of the screen. When the viewer places a cursor on a page, which the viewer desires to view, in the table of contents display portion on the left to select the page, reverse display 38 of a table of contents of the page is performed, and contents of a material such as a manual of the page are displayed on the right of the screen.

Next, a control processing procedure for executing the above-mentioned processing will be explained on the basis of a flowchart shown in FIG. 6. Note that, in the following description, the functional units shown in FIG. 2, which execute the processing, are indicated in parentheses.

In FIG. 6, first, in step S1, the web page viewing apparatus 3 inputs a selection signal for a page to be displayed of a Web page (the page to be displayed selecting unit 13). In the above-mentioned example of operation, this selection of a page to be displayed is selection of the view starting switch 29 on the material to be viewed selection screen of the Web page shown in FIG. 4, selection of a page of a table of contents in the respective materials to be viewed shown in FIG. 5, or the like. After inputting the selection signal for a page to be displayed, in step S2, the Web page viewing apparatus 3 checks whether an operation mode currently selected is online or offline. When the operation mode is online, in step S3, the Web page viewing apparatus 3 further checks whether Web data of the selected page to be displayed (including image information data and table of contents information data; this applies to the following description as well) in the local folder (the first comparing unit 12). When the Web data is stored in the local folder, in step S4, the Web page viewing apparatus 3 inputs data on a date of update (or a version number may be acceptable; this applies to the following description as well) for the Web data from the Web server and compares the date of update with the date of update for the image information data stored in the image information storing unit 17 in the local folder and the date of update for the table of contents information data stored in the table of contents information storing unit 16, respectively (the first storing unit 12).

Then, in step S5, the Web page viewing apparatus 3 checks whether the Web data of the Web server 2 is newest as a result of the comparison. When the Web data is the newest, in step S6, the Web page viewing apparatus 3 downloads latest image information data and table of contents information data from the Web server 2, stores the image information data in the image information storing unit 17 in the local folder, stores the table of contents information data in the table of contents information storing unit 16, and displays image information on the display unit 15 (the first comparing unit 12). Thereafter, the Web page viewing apparatus 3 returns to step S1 and repeats the processing. When the Web data of the Web server 2 is not newest in step S5, in step S7, the Web page viewing apparatus 3 reads the image information data from the image information storing unit 17 in the local folder and displays the image information data on the display unit 15 (the first comparing unit 12). Thereafter, the Web page viewing apparatus 3 returns to step S1 and repeats the processing.

When the Web data of the selected page to be displayed is not stored in the local folder in step S3, the Web page viewing apparatus 3 shifts to step S6, downloads image information data and table of contents information data from the Web server 2, stores the image information data in the image information storing unit 17 in the local folder, stores the table of contents information data in the table of contents information storing unit 16, and displays image information on the display unit 15 (the first comparing unit 12).

When the operation mode is offline in step S2, in step S8, the Web page viewing apparatus 3 checks whether the Web data of the selected page to be displayed is stored in the local folder. When the Web data is stored in the local folder, the Web page viewing apparatus 3 shifts to step S7 and performs the same processing. When the Web data is not stored in the local folder in step S8, in step S9, for example, as shown in FIG. 7, the Web page viewing apparatus 3 outputs an instruction to display a message, which indicates that the Web data of the page to be displayed is not stored in the local folder, to the display unit 15 and displays a message urging a user to download the Web data online via the Internet (the first comparing unit 12). Thereafter, the Web page viewing apparatus 3 returns to step S1 and repeats the processing.

According to the embodiment, the Web page viewing apparatus 3 in accordance with the present invention has a local folder dedicated for a Web page as a client and stores image information data at the time when the Web page is viewed online in this local folder together with table of contents information data of the Web page. Thereafter, when a viewer views the identical Web page online, the Web page viewing apparatus 3 displays Web data of the identical page when the Web data is present in the local folder. Thus, display time is reduced, and the viewer can view the Web page even when there is a communication failure. In addition, the viewer can view the Web page offline with the same operability as online even in locations where a communication failure tends to occur such as an underground shopping arcade and the inside of a building. In this case, since table of contents information of a material to be viewed of the Web page is stored in the local folder together with image information, the Web page viewing apparatus 3 can display an arbitrary page of a material (material including systematic contents such as a maintenance manual) of the Web page with reference to this table of contents information, and operability at the time of viewing is very high. Moreover, in the case in which the latest Web data of a page to be viewed is present in the Web server, the Web page viewing apparatus 3 automatically downloads image information and table of contents information of this latest Web data and stores the image information and the table of contents information in the local folder, and at the same time, displays the image information and the table of contents information. Therefore, the viewer is not required to be conscious whether a date of update of Web data in the local folder is earlier or later, operability is extremely improved, and the user can always view the latest Web data.

Figure 8:
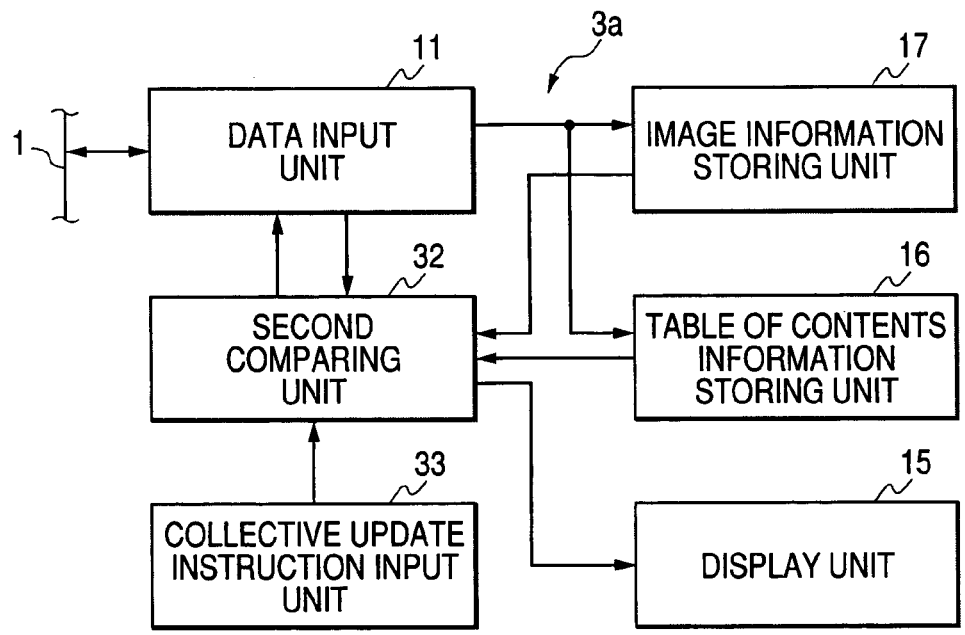
FIG. 8 is a functional block diagram in accordance with the second embodiment of the invention.

Next, a second embodiment of the present invention will be explained. FIG. 8 is a functional block diagram in accordance with this embodiment. Note that, in FIG. 8, components having substantially the same functions as those of the functional units shown in FIG. 2 are denoted by the identical reference numerals and will not be explained below. A Web page viewing apparatus 3a in accordance with this embodiment includes the data input unit 11, a second comparing unit 32, a collective update instruction input unit 33, the display unit 15, the table of contents information storing unit 16, and the image information storing unit 17. The collective update instruction input unit 33 inputs a collective update instruction according to an operation of the collective update software starting switch 22 shown in FIG. 3 and inputs an instruction signal according to an operation of a keyboard, a cursor, or the like.

The second comparing unit 32 updates Web data of all pages of a Web page collectively in response to the input of the collective update instruction. That is, for each page, the second comparing unit 32 compares data on a date of update for Web page image information inputted from the Web server 2 via the data input unit 11 and data on a date of update for Web page image information stored in the image information storing unit 17 in the local folder. When the date of update for the Web page image information of the Web server 2 is later than the date of update of the Web page image information in the local folder, the second comparing unit 32 inputs the Web page image information data from the Web server 2 and stores the Web page image information data in the image information storing unit 17 in the local folder. In addition, the second comparing unit 32 compares data on a date of update for Web page table of contents information inputted from the Web server 2 and data on a date of update for table of contents information of a Web page stored in the table of contents information storing unit 16 in the local folder. When the date of update for the table of contents information of the Web server 2 is later than the date of update for the table of contents information of the Web page in the local folder, the second comparing unit 32 inputs table of contents information data from the Web server 2 and stores the table of contents information data in the table of contents information storing unit 16 in the local folder.

Figure 9:
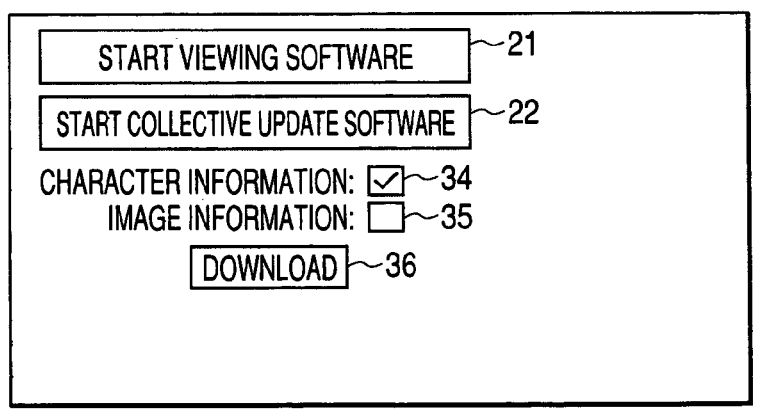
FIG. 9 is a diagram showing an example of a selected screen at the time when a collective update software is started in accordance with the second embodiment of the invention.

FIG. 9 shows an example of a screen at the time of starting collective update software. An operation procedure will be explained according to FIG. 9. When a viewer places a cursor on the collective update software starting switch 22 on the startup screen shown in FIG. 3 to perform a startup operation, a selection screen as shown in FIG. 9 is displayed on the graphic display device 5. On this selection screen, an application file selecting unit 34, an image information file selecting unit 35, and a download switch unit 36 are displayed. When the viewer places a cursor on the application file selecting unit 34 to perform a selection operation (depresses an Enter key or clicks a mouse button; this applies to the following description as well), a check mark is displayed, and character information is selected as an object of update. In addition, when the viewer places a cursor on the image information file selecting unit 35 to perform a selection operation, a check mark is displayed, and background image information as an object of update is selected. Then, when the viewer places a cursor on the download switch unit 36 to perform a startup operation, collective update processing begins.

FIG. 10 is a flowchart showing a procedure for collective update processing of the Web page viewing apparatus 3a.

First, in step S21, the Web page viewing apparatus 3a checks whether a collective update instruction is inputted by the collective update instruction input unit 33. If the collective update instruction is inputted, in step S22, the Web page viewing apparatus 3a inputs a type selection instruction for a material to be viewed on a web page, and in step S23, sets a page parameter to 1. Note that the type selection for a material to be viewed on a Web page is performed by, for example, a selection switch of the machine model 25 in the Web page materials to be viewed 26, 27, and 28 shown in FIG. 4 (a switch equivalent to the view starting switch 29 shown in the figure).

Next, in step S24, the Web page viewing apparatus 3a checks whether Web data corresponding to the page parameter is stored in the local folder (the second comparing unit 32). When the Web data is stored in the local folder, in step S25, the Web page viewing apparatus 3a inputs data on dates of update for image information data and table of contents information data of the pages, respectively, from the Web server 2 and compares the dates of update with dates of update for the data in the image information storing unit 17 and the table of contents information storing unit 16 in the local folder, respectively (the second comparing unit 32). Then, in step S26, the Web page viewing apparatus 3a checks whether the Web data of the Web server 2 is newest. When the Web data is newest, in step S27, the Web page viewing apparatus 3a downloads the latest image information data and table of contents information data from the Web server 2, stores the image information data in the image information storing unit 17 in the local folder, and stores the table of contents information data in the table of contents information storing unit 16 in the local folder (the second comparing unit 32). Thereafter, the Web page viewing apparatus 3a shifts the processing to step S28. When the Web data of the Web server 2 is not newest in step S26, the Web page viewing apparatus 3a shifts to step S28. In addition, when Web data corresponding to the page parameter is not stored in the local folder in step S24, the Web page viewing apparatus 3a shifts to step S27 (the second comparing unit 32).

In step S28, the Web page viewing apparatus 3a increments the page parameter by one, and in step S29, checks whether the page parameter has reached a maximum page of the material, that is, the processing has been finished to the last page (the second comparing unit 32). When the processing has not been finished to the last page, the Web page viewing apparatus 3a returns to step S24 and repeats the processing. When the processing has been finished to the last page, the Web page viewing apparatus 3a returns to step S21 and repeats the processing from the beginning (the second comparing unit 32).

As described above, according to the second embodiment, the Web page viewing apparatus 3a updates all pages of a viewed material of a Web page collectively in the local folder storing the material. Thus, an operation for update becomes very easy for the viewer, and operability can be improved. In addition, since specific material types can be selected and updated collectively, efficient update work can be performed.

Note that, in the embodiments, the first comparing unit 12 and the second comparing unit 32 are explained as separate functional components. However, a functional component having the functions of both the comparing units may be provided.

In the above embodiments, a keyboard, a mouse, or the like is used as the operation device 7. However, the operation device 7 is not limited to this, and for example, a touch panel mounted on the front of the graphic display device 5 can also be adopted.

What is claimed is:

1. A Web page viewing apparatus comprising:
a display screen;
an image information storing unit for storing image information of a Web page viewed online from a Web server;
a selecting unit for selecting a page of a Web page image that a viewer desires to view; and
a first comparing unit displaying image information corresponding to the selected page on the display screen, the first comparing unit independently from user input:
   if the Web page is offline, then displaying the image information stored in the image information storing unit corresponding to the selected page, and
   if the Web page is online, then
      comparing the image information stored in the image information storing unit with corresponding image information from the Web page available online from the Web server,
      if the image information stored in the image information storing unit is newer than the corresponding image information from the Web page available online, then displaying the image information stored in the image information storing unit corresponding to the selected page and updating the displayed image information and the image information stored in the image information storing unit from the corresponding image information from the Web page available online, otherwise displaying the image information from the Web page.

2. The Web page viewing apparatus according to claim 1, wherein the image information storing unit stores image information of the selected page and data on a date of update for the image information of the selected page on the Web page, and
wherein the first comparing unit:
   at the time of viewing the Web page, when the image information corresponding to the selected page is stored in the image information storing unit, compares the date of update for the image information stored in the image information storing unit with a date of update for the image information corresponding to the selected page in the Web server, and
   when the image information corresponding to The selected page in the Web server is newer, reads the newer image information corresponding to the selected page from the Web server, and updates the image information of the selected page stored in the image information storing unit to the newer image information.

3. The Web page viewing apparatus according to claim 2, further comprising:
a table of contents information storing unit for storing a table of contents data on the Web page and data on a date of update for the table of contents data on the Web page,
wherein the first comparing unit:
   at the time of viewing the Web page, compares a date of update for the table of contents data stored in the table of contents information storing unit with a date of update for table of contents data in the Web server, and
   when the table of contents data in the Web server is newer, reads the table of contents data in the Web sewer, and updates the table of contents data stored in the table of contents information storing unit to the read table of contents data.

4. The Web page viewing apparatus according to claim 3, further comprising:

a second comparing unit that, independently from user input and at the time of viewing the Web page, updates the image information stored in the image information storing unit collectively to the latest image information corresponding to all pages in the Web server.

5. The Web page viewing apparatus according to claim 4, further comprising:
   a second selecting unit that selects Web page materials, which are objects to be updated collectively, for the Web page viewing apparatus,
   wherein the second comparing unit updates the Web page materials selected by the second selecting unit collectively.

6. The Web page viewing apparatus according to claim 2, further comprising:
   a second comparing unit that, independently from user input and at the time of viewing the Web page, updates the image information stored in the image information storing unit collectively to the latest image information corresponding to all pages in the Web server.

7. The Web page viewing apparatus according to claim 6, further comprising:
   a second selecting unit that selects Web page materials, which are objects to be updated collectively, for the Web page viewing apparatus,
   wherein the second comparing unit updates the Web page materials selected by the second selecting unit collectively.

8. The Web page viewing apparatus according to claim 1, further comprising:
   a table of contents information storing unit for storing a table of contents data on the Web page and data on a date of update for the table of contents data on the Web page,
   wherein the first comparing unit:
      at the time of viewing the Web page, compares the date of update for the table of contents data stored in the table of contents information storing unit with a date of update for table of contents data in the Web server, and
      when the table of contents data in the Web server is newer, reads the table of contents data in the Web server, and updates the table of contents data stored in the table of contents information storing unit to the read table of contents data.

9. The Web page viewing apparatus according to claim 8, further comprising:
   a second comparing unit that, independently from user input and at the time of viewing the Web page, updates the image information stored in the image information storing unit collectively to the latest image information corresponding to all pages in the Web server.

10. The Web page viewing apparatus according to claim 9, further comprising:
    a second selecting unit that selects Web page materials, which are objects to be updated collectively, for the Web page viewing apparatus,
    wherein the second comparing unit updates the Web page materials selected by the second selecting unit collectively.

11. The Web page viewing apparatus according to claim 1, farther comprising:
    a second comparing unit that, independently from user input and at the time of viewing the Web page, updates the image information stored in the image information storing unit collectively to the latest image information corresponding to all pages in the Web server.

12. The Web page viewing apparatus according to claim 11, further comprising:
    a second selecting unit that selects Web page materials, which are objects to be updated collectively, for the Web page viewing apparatus,
    wherein the second comparing unit updates the Web page materials selected by the second selecting unit collectively.

* * * * *